United States Patent [19]

Dixon

[11] Patent Number: 5,585,962
[45] Date of Patent: Dec. 17, 1996

[54] EXTERNAL RESONANT FREQUENCY MIXERS BASED ON DEGENERATE AND HALF-DEGENERATE RESONATORS

[75] Inventor: George J. Dixon, Harbor Beach, Fla.

[73] Assignee: Amoco Corporation, Chicago, Ill.

[21] Appl. No.: 473,669

[22] Filed: Jun. 7, 1995

[51] Int. Cl.$^6$ ........................................ H01S 3/109
[52] U.S. Cl. .................... 359/328; 372/22; 372/92
[58] Field of Search ........................... 359/326–332; 372/21, 22, 92, 95, 98, 99, 101

[56] References Cited

U.S. PATENT DOCUMENTS

| | | | |
|---|---|---|---|
| 3,576,502 | 4/1971 | Johnston, Jr. et al. | 372/92 X |
| 4,879,722 | 11/1989 | Dixon et al. | 372/21 |
| 4,879,723 | 11/1989 | Dixon et al. | 372/21 |
| 4,977,562 | 12/1990 | Welch et al. | 372/95 X |
| 5,297,156 | 3/1994 | Deacon | 372/21 |
| 5,412,676 | 5/1995 | Schnier et al. | 372/22 X |

OTHER PUBLICATIONS

"Resonant Optical Second Harmonic Generation and Mixing"; A. Ashkin, G. D. Boyd and J. M. Dziedzic; IEEE *Journal of Quantum Electronics*, vol. QE–2, No. 6; Jun. 1966; 16 pages.

"Infrared Detection by Optical Mixing"; D. A. Kleinman and G. D. Boyd; *Journal of Applied Physics*, vol. 40, No. 2; Feb. 1968; 21 pages.

"Efficient Second Harmonic Generation of a Diode–Laser–Pumped CW Nd:YAG Laser Using Monolithic MgO:LiNbO$_3$ External Resonant Cavities"; William J. Kozlovsky, C. D. Nabors, and Robert L. Byer; *IEEE Journal of Quantum Electronics*, vol. 24, No. 6; 1988; 6 pages. (Jun. 1988).

"432–nm Source Based on Efficient Second–Harmonic Generation of GaAlAs diode–laser Radiation in a Self–Locking External Reasonant Cavity"' G. J. Dixon; *Optica Letters*, vol. 14, No. 14; Jul. 15, 1989; 3 pages.

"Second–Harmonic Generation and Optical Stabilization of a Diode Laser in an External Ring Resonator"; A. Hemmerich, D. H. McIntyre, C. Zimmerman, and T. W. Hänsch; *Optics Letters*, vol. 15, No. 7; Apr. 1, 1990; 3 pages.

"Doubly–Reasonant Second–Harmonic Generation in β–Barium–Borate"; C. Zimmerman, R. Kallenbach, T. W. Hänsch; *Optics Communications*, vol. 71, No. 3–4; May 15, 1989; 6 pages.

"523–nm Composite–Cavity Internally–Doubled Close–Coupled LNP Cube Laser"; G. J. Dixon and S. G. Grubb; *CLEO Postdeadline Papers*, 1990; 2 pages. [no month].

Chaps. 19 and 21 of "Lasers"; A. E. Siegman; 1986; 23 pages [no month].

"Degenerate Optical Cavities"; J. A. Arnaud; *Applied Optics*, vol. 8, No. 1; Jan. 1969; 7 pages.

"Laser Beams and Resonators"; H. Kogelnik and T. Li; *Applied Optics*, vol. 5, No. 10; Oct. 1966; 17 pages.

*Primary Examiner*—John D. Lee
*Attorney, Agent, or Firm*—Leydig, Voit & Mayer, Ltd.

[57] ABSTRACT

A resonator for generating frequency converted radiation from an input laser light source or sources, the resonator comprising a quantity of non-linear optical material which converts the input light to the frequency converted radiation, and an optical cavity enclosing the non-linear optical material, the cavity including optical elements disposed such that the cavity is degenerate for the transverse modes of either the frequency converted radiation or the input light.

21 Claims, 5 Drawing Sheets

EXTERNAL RESONANT FREQUENCY MIXERS BASED ON DEGENERATE AND HALF-DEGENERATE RESONATORS

FIELD OF THE INVENTION

The invention relates generally to external cavities for use in conjunction with lasers, and more particularly to external cavities for generating harmonics of input laser light, and for generating summed outputs of input laser light.

BACKGROUND OF THE INVENTION

There presently exists a need for efficient and compact sources of coherent radiation at a variety of visible and infrared wavelengths. Since efficient laser sources do not exist to meet this need, other mechanisms must be employed to generate coherent radiation at these wavelengths. Non-linear optical materials, which have non-linear optical susceptibilities that allow the material to generate radiation at a wavelength which differs from the wavelength of radiation applied to the material, present one way for achieving the desired visible and infrared sources. The unique properties of these materials can either be used to perform frequency conversion to generate harmonics of a given laser radiation, or to provide coupling between radiation of different frequencies to produce optically mixed sums or differences of the input radiation. By such frequency conversion techniques, the desired light can be generated from existing stable wavelength sources such as laser diodes or diode-pumped Nd:YAG lasers. For the purpose of frequency-doubling, a non-linear optical material may either be placed in the laser cavity (intracavity), or may be placed in an external cavity. In the intracavity case, the harmonic is resonated. In the external cavity case, either the fundamental or the harmonic, or both, may be resonated. Similarly, optical mixing may be performed either in an external cavity having two inputs to be summed or subtracted, or in an intracavity setting where the non-linear optical material is placed in the laser cavity, and the intracavity field of the laser is one of the "inputs".

One method for second harmonic generation (SHG) in an external cavity is described by Ashkin, et al, in "Resonant Optical Second Harmonic Generation and Mixing," *IEEE Journal of Quantum Electronics*, QE-2, pp. 106–124. The Ashkin article demonstrates the advantage of using an external resonant cavity to enhance the fields present in the doubling crystal, as compared to using a nonresonant single-pass technique. In Ashkin, the input light has ordinary polarization, and the generated second harmonic has extraordinary polarization. According to Ashkin, the presence of an external field at the second harmonic frequency will increase the power radiated by the non-linear crystal at the extraordinary polarization, assuming the external field is of the proper phase. Such an external field is effectively built up in a cavity that is resonant for the second harmonic in a technique referred to herein as the harmonic singly-resonant technique.

Ashkin also discusses making the external cavity resonant for the fundamental instead of the second harmonic, in what will be referred to herein as the fundamental singly-resonant technique. For this case, the conversion efficiency is improved as compared to the single-pass case since the power of the generated second harmonic is proportional to the square of the fundamental power passing through the crystal. Other literature examples of SHG using resonance of the fundamental include: "Efficient Second Harmonic Generation of a Diode-Laser Pumped CW Nd:YAG Laser Using Monolithic MgO:LiNbO$_3$External Resonant Cavities," by Kozlovsky, et al, in *IEEE Journal of Quantum Electronics*, 24, 913–919 (1988); "432-nm Source Based on Efficient Second-Harmonic Generation of GaAlAs Diode-Laser Radiation in a Self-Locking External Resonant Cavity," by Dixon, et al, in *Optics Letters*, 14, pp. 731–733 (1990); and "Second Harmonic Generation and Optical Stabilization of a Diode Laser in an External Ring Resonator," by Hemmerlich, et al, in *Optics Letters*, 15, pp. 372–374 (1990).

A more efficient technique for resonant SHG is discussed in "Doubly-resonant Second-Harmonic Generation in B-barium Borate," by Zimmerman, et al, *Optics Communications*, 71, pp. 229–234 (1989). According to this "doubly resonant" technique, the optical cavity is resonant for both the fundamental and the second harmonic, leading to greater output efficiencies for the output second harmonic. Further, such "double resonance" was used in an intracavity setting for SHG in "523-nm Composite-Cavity Internally-Doubled Close-Coupled LNP Cube Laser," Dixon et al, *Postdeadline Papers*, CLEO ' 89 (Optical Society of America, Washington , D.C., 1989) Paper CPDP37.

Second harmonic generation by the alternative singly-resonant techniques described above yield fair results, but only under limited circumstances. For example, the techniques only work well for non-linear materials having a significant non-linearity, generally in excess of 2 pm/volt. Second harmonic generation using singly-resonant techniques have been shown for 1064-nm Nd:YAG laser light using KTP or LiNbO$_3$ as the non-linear crystal. Nonlinear materials capable of frequency-doubling lower frequency incident light (between 780 and 830 nm) are available, but have effective non-linearities and/or material properties which are too small for effective use in commercial devices. Materials capable of frequency-doubling of higher frequency light are also available, but either suffer from low non-linearities (KDP and LBO), or from a need to be heated to unduly high temperatures (300° C. for lithium niobate) for red, but not for blue in order to achieve the required phase matching.

While the singly-resonant systems are limited by the practical material considerations described above, they are also limited by their optical properties. In the fundamental singly-resonant case where the cavity is made resonant for the fundamental, a high output power for the second harmonic is achieved since the output power goes as the square of the fundamental power through the crystal. Of course, to ensure maximum fundamental power through the crystal, the input fundamental beam must be spatially matched to the TEM$_{00}$ mode at the frequency of the fundamental. Since the spatial quality of the input fundamental (e.g. as generated by a diode laser) is sometimes poor, expensive optics must be added to the SHG system to mode match the input beam to the cavity. Thus, the good power conversion achieved by resonating the fundamental is paid for by the need to add the optics necessary for mode matching.

The case of harmonic singly-resonant SHG, where the harmonic is resonated, is also limited by optical properties. Double refraction effects in the doubling crystal lead to Poynting vector walkoff for the generated second harmonic in the case of critical phase-matching. Accordingly, the second harmonic radiation resulting from a single pass through the doubling crystal is both non-Gaussian and displaced in the x-direction from the input Gaussian fundamental as discussed at page 110, et seq. in Ashkin. For this type of singly-resonant SHG, the cavity is made resonant for the second harmonic to provide power enhancement of the second harmonic generation in the crystal. The resulting resonating harmonic field is also displaced in the x-direction due to walkoff, but has a Gaussian profile. The non-Gaussian generated harmonic drives the various modes of the resonator. However, only that portion of the generated harmonic which is matched to the $TEM_{00}$ mode of the harmonic will be resonantly enhanced. Thus, a power-coupling coefficient can be determined by considering the overlap between the generated harmonic and the $TEM_{00}$ mode of the harmonic as a function of crystal length. This coefficient is calculated in Ashkin and is found to be around 35%. As for the higher order transverse modes present in the generated harmonic, these modes resonate at different frequencies than the $TEM_{00}$ mode of the harmonic. As a result, they cannot resonate at the same time as the $TEM_{00}$ mode, and thus do not contribute to the power-enhancement offered by having a cavity that is resonant for the second harmonic. Thus, this singly-resonant technique is limited because of the poor matching between the generated non-Gaussian harmonic and the $TEM_{00}$ mode of the harmonic.

The doubly-resonant techniques of Zimmerman and Dixon, supra, offer advantages over both of these singly-resonant techniques. As recognized by Ashkin, the conversion efficiency of an external resonant frequency doubler can be significantly increased by resonating the fundamental input as well as the harmonic field of the external resonant cavity. The increased efficiency of harmonic conversion is maximized if the transmission of the output mirror at the wavelength of the second harmonic (or the sum or difference frequency for optical mixing) is equal to the intracavity losses at the output wavelength, and if certain conditions on the relative phases are met. The equality between transmission and intracavity losses can be realized by properly selecting the mirror transmissions. The phase and mode structure conditions are more difficult to meet.

The first requirement for a doubly-resonant system is that the round-trip phase shift experienced by both the fundamental and harmonic waves, as they return to the nonlinear crystal faces following reflection from the mirrors must be an integral multiple of $2\pi$. For ring resonators, a similar condition holds at the front face of the non-linear crystal. This requirement can be met by: 1) varying the dispersion of the intracavity medium between the non-linear crystal and the mirrors; and/or 2) controlling the relative phase shifts of the fundamental and harmonic upon reflection from the cavity end mirrors; and/or 3) introducing a birefringent material between the crystal and the end mirrors. In the Zimmerman article, the angle of the non-linear crystal relative to the resonator, and its position along the axis of the cavity were used to control the phases at the crystal surfaces.

Even when the requirement of matched phase shifts in doubly-resonant cavities is met, the maximum benefit of output resonance can only be achieved if another condition is met. That condition requires that all of the output power produced in the non-linear crystal be frequency-matched to the resonator. For non-critically-phase-matched (where propagation of the generated light is along the optical axis of the crystal) harmonic generation and optical mixing, this condition is automatically fulfilled. For the critically-phase-matched case, however, Poynting vector walkoff creates a situation, similar to that of the harmonic singly-resonant case, in which the harmonic generated by the fundamental passing through the crystal is not spatially matched to the $TEM_{00}$ mode of the harmonic (which is at the extraordinary polarization). Further, and also as in the harmonic singly resonant case, only that portion of the generated harmonic which is in the $TEM_{00}$ mode of the harmonic is power enhanced, and the higher order transverse modes of the generated harmonic do not resonate and are thus not power-enhanced in the resonator. As discussed in Zimmerman, however, significant harmonic power is present in these higher order transverse modes. Thus, while doubly-resonant cavities offer advantages over singly-resonant ones, resonating the power contained in the higher order transverse modes would result in even more significant increases in harmonic output power.

Similar increases in output power could also be realized for both intracavity SHG and optical mixing if matching of the higher order transverse modes of the output to the $TEM^{00}$ mode of that output could be achieved.

SUMMARY OF THE INVENTION

Accordingly, it is a primary object of the invention to provide for laser frequency conversion that exhibits better power-conversion efficiencies than have been provided heretofore.

It is a related object to provide an external cavity for harmonic generation exhibiting enhanced power-conversion efficiencies.

It is a further related object of the invention to increase the coupling between the generated harmonic and the resonant modes of the harmonic for a given external cavity to fully resonate the higher order modes.

Another object of the invention is to reduce the external optical components used for mode-matching in generation in external cavities.

Another object of the invention is to provide for optical mixing exhibiting the increased power-conversion efficiencies referred to in regard to harmonic generation.

Another object is to provide intracavity harmonic generation exhibiting increased power-conversion efficiencies.

In accordance with these and other objects of the invention, there is provided a resonator for generating second harmonic radiation from an input laser light source which fully couples and matches the generated harmonic to the $TEM_{00}$ mode of the harmonic by providing a resonant cavity that is degenerate for the transverse modes of the second harmonic. A degenerate cavity is defined as a cavity wherein the transverse modes of a given axial mode all resonate at the same frequency. By providing a cavity enclosing the non-linear, frequency doubling material that is degenerate for the transverse modes of generated harmonic, and that is resonant for at least the second harmonic, if not the second harmonic and the fundamental, the increased coupling and accompanying power-enhancement are achieved. Various types of degenerate cavities are provided with similar results.

According to alternative embodiments of the invention, degenerate cavities are also used for power-enhancement of optical mixing—for generating both sum and difference radiation; and for intracavity SHG.

According to a further alternative embodiment, the external cavity is made degenerate and resonant for the fundamental. Since all of the transverse modes of the cavity are resonant at the same frequency, the entire input beam will be resonantly enhanced in the cavity regardless of its spatial quality. Accordingly, the optics typically required for mode-matching of the fundamental may be eliminated. While the conversion efficiency for generating second harmonic may be reduced, the advantage realized by omission of mode-matching optics will, in certain cases, more than compensate for any such reduction. Further, such a cavity may also be made resonant for the second harmonic to increase conversion efficiency.

The invention also embodies a method for efficiently generating a second harmonic signal from an input laser signal. According to that method, laser light is admitted into an optical cavity. That light is then passed through a non-linear optical material tuned to generate second harmonic light. A circulating harmonic field is produced by making the cavity resonant for at least the second harmonic. The transverse modes of the generated second harmonic are fully coupled to the circulating harmonic field to achieve power-enhancement of the generated second harmonic. Finally, a portion of the power-enhanced, generated harmonic is removed from the cavity as an output signal. A similar method also applies to a method for efficiently generating optically mixed output signals.

DETAILED DESCRIPTION OF THE PREFERRED EMBODIMENT

Figure 1:
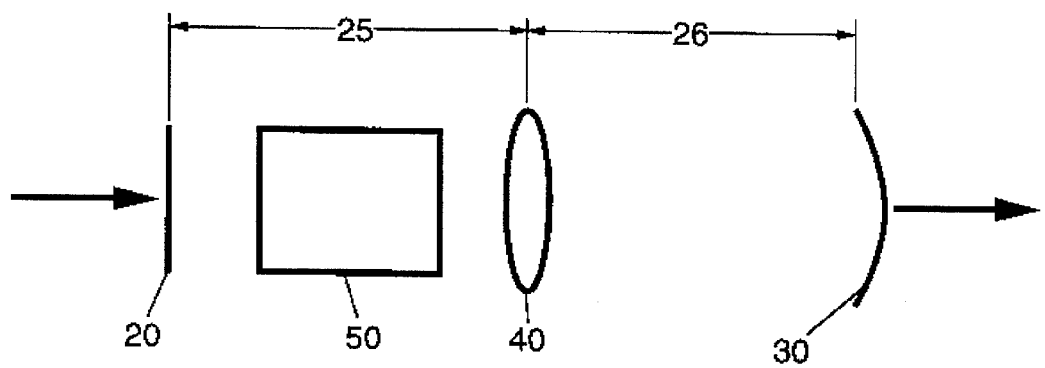
FIG. 1 is a schematic representation of a degenerate doubly-resonant second harmonic generator according to one embodiment of the present invention.

The external resonant cavities used for either second harmonic generation (SHG) or frequency mixing according to the invention, all fall within a class of resonators known as either degenerate or half-degenerate resonators. The theory of these types of resonator are discussed in the article *Degenerate Optical Cavities* by J. A. Arnaud found beginning at page 189 of the January 1969, Volume 8, No. 1 of Applied Optics. Arnaud describes degenerate optical cavities using the familiar ABCD ray matrix formalism. A complete discussion of the ray matrix formalism is found in Chapter 15 of *Lasers* by A. Siegman, © 1986, University Science Books. Mathematically, a degenerate cavity is a cavity defined by a round trip ray matrix ABCD that is unitary. That is, the elements of the ray matrix must satisfy the condition: B=C=0; and A=D=1. Physically, a resonator having this round trip ray matrix configuration has several interrelated and important characteristics. One characteristic is that any arbitrary ray exactly retraces its path on a round trip through the resonator. The same holds true for an arbitrary electric field propagating through the resonator. Such a field always returns to the input plane in the exact same configuration as it left that plane. Accordingly, in a degenerate cavity, the arbitrary input electric field may be considered a mode of the cavity. Indeed, any field configuration is a mode of the cavity.

Another way to define a degenerate cavity is to consider the resonant frequencies of the transverse modes. In a typical, non-degenerate resonant cavity, each transverse mode resonates at a different frequency. Accordingly, only one transverse mode is resonant for a given cavity configuration. In a degenerate cavity, however, all of the transverse modes have an identical resonant frequency, i.e. they are "degenerate" in frequency. This explains why an arbitrary electric field can be viewed as a mode of the cavity. According to the superposition principal, any arbitrary electric field can be expanded as a series of the eigenmodes (or transverse modes) of the resonator cavity. In a typical resonator, the cavity is only resonant for one of these transverse modes. Accordingly all the terms in the expansion corresponding to any mode besides that mode which is resonant are lost in the cavity. For the degenerate cavity, however, all the transverse modes are resonant. Accordingly, all terms in the expansion propagate without attenuation in the cavity. Since none of the constituent components of an arbitrary input field are lost in the cavity, the arbitrary input field will look the same after a round trip through the cavity.

According to the invention, this unique characteristic of degenerate resonators is used to enhance the conversion efficiency in the non-linear crystal for either second harmonic generation, or optical mixing. By carrying out harmonic generation or mixing in a cavity degenerate for the output wavelength, significant power enhancement is achieved as compared to either the harmonic singly resonant or the doubly resonant techniques previously described. In the harmonic singly-resonant part of Ashkin, the cavity was only resonant for the $TEM_{00}$ mode of the harmonic. The harmonic field generated by a single pass through the non-linear material, however, excites several modes of the resonator other than the $TEM_{00}$ mode of the harmonic. Since only the $TEM_{00}$ mode of the harmonic is resonant in the non-degenerate cavity of Ashkin, the portion of the generated harmonic which is not $TEM_{00}$ is lost in the cavity. Ashkin calculates that overlap between the generated harmonic and the $TEM_{00}$ mode of the harmonic and finds that, for the best case, the coupling is approximately 35%. This "overlap" can best be understood as the coefficient multiplying the $TEM_{00}$ mode of the harmonic in the eigenmode expansion of the generated harmonic. Through use of a degenerate resonator according to the invention, however, all of the modes which make up the eigenmode expansion of the generated second harmonic are resonant and thus power enhanced in the cavity. Accordingly, the coupling between the generated harmonic and the resonant modes of the cavity can be as high as 100%, as compared to the 35% achieved in the harmonic resonator as described in Ashkin.

A similar result would obtain for the doubly resonant cavity discussed in Zimmerman. In that case, the harmonic is generated by a fundamental input beam that is mode-matched to the $TEM_{00}$ mode of the cavity at the fundamental frequency. This fundamental generates a harmonic field that exhibits Poynting vector walkoff as it travels in both directions through the crystal. The cavity is also resonant for the $TEM_{00}$ mode at the harmonic frequency. Again, however, for the cavity in Zimmerman, only the term in the eigenmode expansion of the generated harmonic corresponding to the $TEM_{00}$ mode of the harmonic would be resonant, and the remainder of the expansion terms would be lost in the cavity. Thus, while resonance of the cavity for both the input wavelength and the harmonic improves efficiency as compared to Ashkin, the problem still remains of the higher order modes present in the harmonic field being lost. However, if the Zimmerman cavity is modified, according to the invention, to be degenerate for the harmonic, this problem is eliminated. In that case, all of the transverse modes present in the generated harmonic resonate in the cavity, thus insuring that the entire generated field is power enhanced in the cavity.

As shown in the Arnaud article, a wide variety of resonator configurations are degenerate cavities. As stated previously, so long as the round trip ray matrix of such a cavity is unitary (A=D=1, B=C=0) the cavity will be degenerate. Arnaud also discusses a class of resonators referred to as half-degenerate cavities. In these cavities, A=D=1, and B=C=0 for the round trip ray matrix. The result is that the transverse modes break up into only two families, each family having its own resonant frequency. In a half-degenerate cavity, all of the even order transverse modes (meaning the sum of m and n for the $TEM_{mn}$ mode is an even integer) have the same resonant frequency, as do all of the odd modes. Obviously then, half-degenerate simply means that half the modes are degenerate at one frequency, and half the modes are degenerate at a different frequency. As will be discussed, use of a half degenerate cavity, according to the invention, will offer power conversion efficiency increases over cavities as shown in Ashkin and Zimmerman which are not degenerate. Thus, whether half degenerate or fully degenerate cavities are used in practicing the invention, increased power conversion efficiencies will be achieved.

A representative embodiment in accordance with the invention is shown in FIG. 1. The resonator 10 of FIG. 1 is a doubly-resonant harmonic generator based on a degenerate doubly-resonant linear cavity consisting of an input mirror 20, and output mirror 30, and a lens 40. Also enclosed within the cavity is a doubling crystal 50. The cavity 10 is tuned to generate second harmonic from an input fundamental 488 nm beam. The flat input mirror 20 is coated for high reflectivity at the harmonic wavelength of 244 nm, and has a reflectivity which is equal to the round trip non-linear and passive non-transmission losses of the cavity. In a typical case, this reflectivity would be greater than 90%. The doubling crystal 50 is illustratively a β-barium borate (BBO) crystal. The BBO crystal 50 is positioned between the input mirror 20 and a best-form UV-grade fused silica lens 40 which is anti-reflection coated on both surfaces for both 488 and 244 nm. The two surfaces of the BBO crystal are also anti-reflection coated for both the fundamental and harmonic wavelengths. The output mirror 30 is a 50 mm concave mirror which is highly reflective at the input 488 nm fundamental wavelength, and has a transmission which is equal to the round trip losses in the cavity at the harmonic wavelength. The spacing of these components is adjusted so that the cavity is fully degenerate. The Arnaud article derives the necessary spacing for a degenerate cavity including a flat mirror, a curved mirror and intermediate lens. The curved mirror has a radius R, and the lens has a focal length f. If the separation 25 between the flat mirror and the lens is $f^2/R+f$, and the separation 26 between the lens and the curved mirror is R+f, the cavity will be degenerate. The optical elements 20, 30, and 40 in FIG. 1 meet this condition. The distance between the curved mirror and the lens is 77 cm, equal to the 50 mm radius of the mirror and the 27 mm focal length of the lens (R+f). The separation between the flat mirror 20 and the lens 40 is equal to 37.98 mm. Using the calculation derived in Arnaud for the separation ($f^2/R+f$), it will be determined that the length should be 41.58 mm. The separation between mirror 20 and lens 40 is equal to 41.58 mm if the length of the 6 mm BBO crystal is properly divided by its index of refraction to determine its effective optical length. With the optical elements thus disposed within cavity 10, the cavity will be degenerate.

In order for the cavity to be resonant for both the input 488 nm beam and the harmonic 244 nm beam, the relative phase conditions discussed in Zimmerman must be met, and the frequency of the 488 nm beam must be electronically locked to a cavity resonance. As in Zimmerman, this is achieved in the resonator 10 by using both the angle of the BBO crystal 50 relative to the resonator, and the position along the axis of the cavity. By adjusting the position of the crystal along the resonator axis, different lengths of air are left on either side of the crystal. Because of the dispersion of air, the difference in the index of refraction for waves at 488 nm and 244 nm will introduce an effective phase difference between the two waves propagating in the same length of air. This effect can be used to macroscopically position the mirrors at either end of the cavity 10. Small fluctuations from resonance for the second harmonic can then be compensated for by tilting the BBO crystal about an axis parallel to the polarization of the ordinarily polarized input wave. This changes the index of refraction of the crystal for only the second harmonic (extraordinary) polarization. These two techniques are used in tandem to achieve the necessary relative phase conditions for double resonance.

With a doubly-resonant and degenerate cavity as shown in FIG. 1, the improved efficiency SHG according to the invention is carried out. Single frequency input radiation from an argon laser (not shown) is mode matched to the fundamental mode of the cavity. The second harmonic generated by this resonant input beam passing through the BBO crystal 50 will be subject to walkoff, and thus have a non-Gaussian, off-axis distribution. Even so, this generated harmonic will be fully power-enhanced in the cavity by virtue of the cavity's degeneracy properties. That is, if an eigenmode expansion of the generated harmonic is done, all of its terms will be resonant in the degenerate cavity since all the transverse modes of the harmonic resonate simultaneously. Accordingly, conversion efficiencies substantially higher than those observed in the doubly-resonant case will be observed.

The embodiment of the invention shown in FIG. 1 is doubly resonant. However, the same advantages in terms of power conversion efficiency increases would be realized in a cavity that was only singly-resonant for the harmonic as in Ashkin. In Ashkin, the cavity was singly resonant (resonant at the harmonic frequency only), but not degenerate. As a result, a harmonic coupling efficiency of only 35% was realized. If that same cavity were made degenerate according to the invention, that efficiency would increase to 100%, since all of the generated harmonic would be resonant in the cavity. In such a case, all optics would either be antireflection coated or highly transmissive at the fundamental wavelength.

Figure 2:
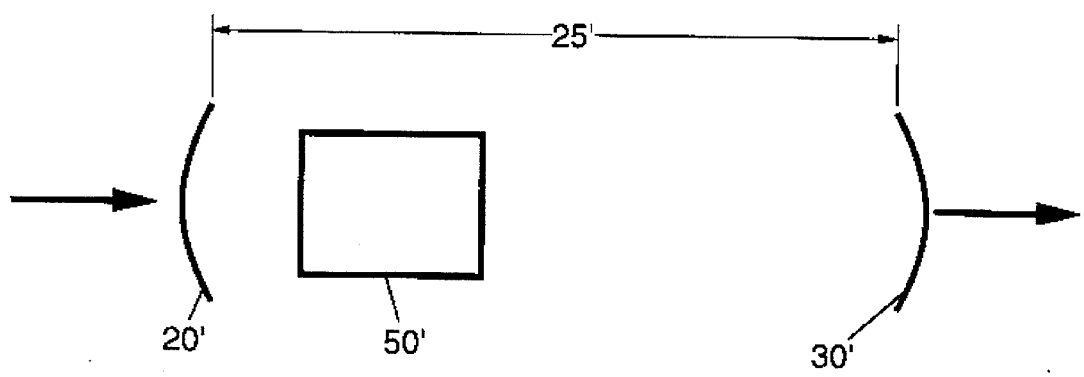
FIG. 2 is a schematic representation of a half-degenerate doubly-resonant second harmonic generator according to an alternative embodiment of the invention.

Furthermore, improved conversion efficiencies would be observed if the cavity of FIG. 1 were only half-degenerate, as opposed to fully degenerate. As is known to those skilled in the art, a confocal resonator is an example of a half-degenerate cavity. In a confocal resonator, spherical mirrors, each having a radius R are separated by the distance R. An external SHG cavity employing such a confocal cavity is shown in FIG. 2. Since the Design considerations (in terms of coatings, transmissions, and reflectivities) are similar to the fully degenerate case, similar reference numerals to FIG. 1, but including a prime(') have been used in FIG. 2. The two mirrors 20', 30' each have radius R The separation 25' between the two mirrors is also equal to R, if the length of the crystal 50' is properly divided by its index of refraction to determine its effective optical length. The confocal resonator does not require a lens. The cavity may be resonant for either the harmonic, or both the harmonic and the fundamental. Conversion efficiencies realized by such a cavity will be smaller than for the fully degenerate case since only half of the transverse modes will be degenerate at the frequency of the $TEM_{00}$ mode. Even so, the half of the terms that are resonant will be fully coupled to the $TEM_{00}$ mode of the harmonic, giving a substantial part of the conversion efficiencies observed for the fully degenerate cavity.

Figure 3:
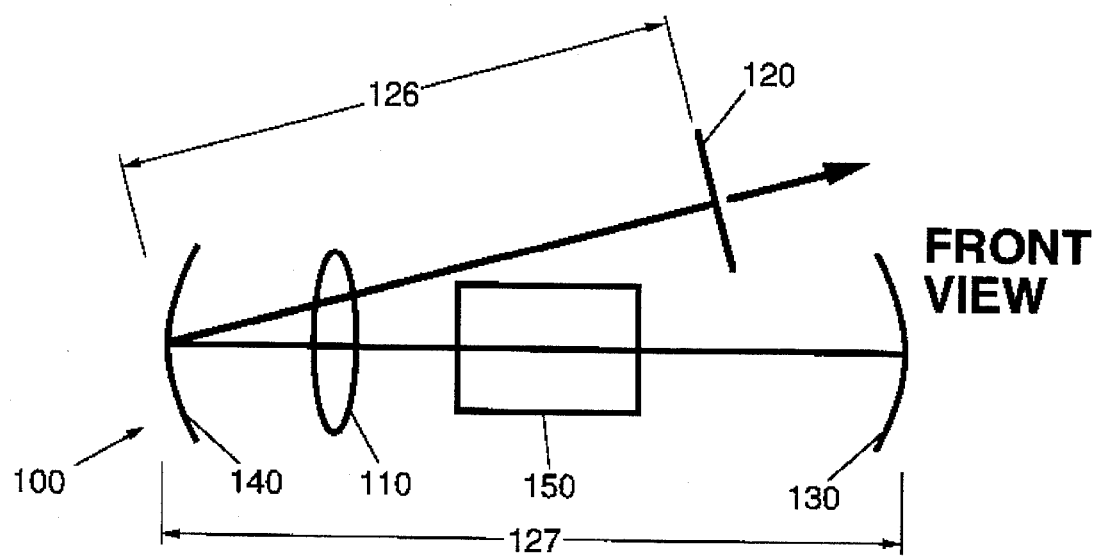
FIG. 3 is a schematic representation of a degenerate doubly-resonant second harmonic generator according to a further embodiment of the invention, wherein a 4-mirror cavity with astigmatism correction is used as the resonator, showing a front view of the generator.
Figure 4:
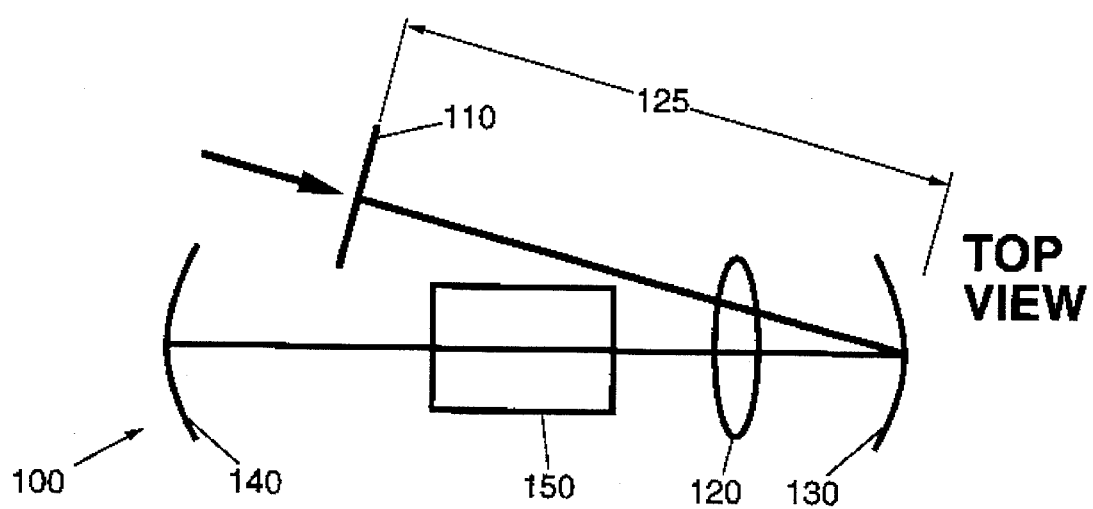
FIG. 4 is a top view of the generator of FIG. 3.

FIGS. 3 and 4 are front and side views of a schematic representation of a 4-mirror degenerate resonator 100, used for SHG according to the invention. The use of a lensless cavity, as opposed to the cavity in the embodiment of FIG. 1, reduces the intracavity losses for both the fundamental and harmonic since the losses of dielectric mirrors are generally less than that of transmission optics, like the lens 21 in the embodiment of FIG. 1. The resonator 100 comprises two flat mirrors 110, 120 and two curved mirrors 130, 140. As can be seen from the top view of FIG. 2 as compared to the side view of FIG. 3, the cavity does not lie in a single plane. This is done to correct for the astigmatism associated with reflection from curved mirrors at non-normal incidence. Arnaud derives the necessary spacing for a degenerate cavity of this kind. In the resonator of FIGS. 3 and 4, the angle of incidence is 10°, and both of the curved mirrors have radii of 50 mm. According to Arnaud's equations the distance 125 between the input mirror 110 and the first spherical mirror 130 must be 24.53 mm, and the same separation 126 is required between the output mirror 120 and the spherical mirror 140. Further, the distance 127 between the spherical mirrors 130 and 140 should be 50 mm, although here the actual separation is 46.16 mm in order to take the actual optical length of the BBO crystal 150 into account.

The input mirror 120 is coated for high reflectivity at the harmonic and a reflectivity at the fundamental that is equal to the round trip cavity losses at the fundamental wavelength. The two curved mirrors 130, 140 are coated for high reflectivity at both the fundamental and harmonic at 10° angle of incidence (for both the ordinary and extraordinary polarizations). The BBO doubling crystal 160 is anti-reflection coated for both the fundamental and the harmonic. The output mirror is highly reflective at the fundamental and has a reflectivity at the harmonic which is equal to the round trip losses of the resonator at the harmonic frequency. The resonator 100 also gives the improved conversion efficiencies observed in the resonator of FIG. 1 due to the advantageous characteristics of degenerate cavities previously described.

The advantageous characteristics of degenerate cavities may also be used for enhanced optical mixing. 584 nm light can be generated by Type 1 sum frequency generation in $MgO:LiNbO_3$. In order to critically phase match this process, the lithium niobate must be heated to temperatures significantly greater than 100C. This is disadvantageous in many cases due to power consumption and heater lifetime issues. Critical phase matching can be used to lower the phase matching temperatures, but this results in walk-off of the sum frequency output. For this reason, a degenerate cavity is advantageous if the mixed radiation is resonated.

Figure 5:
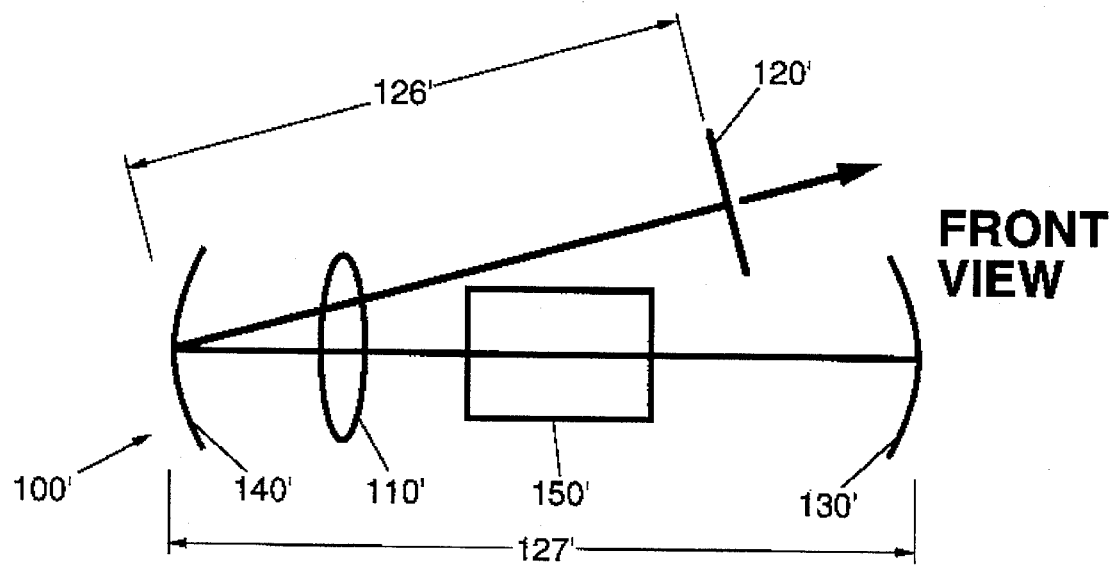
FIG. 5 is a schematic representation of a degenerate optical mixing cavity according to a further embodiment of the invention, wherein a four-mirror cavity a stigmatism correction is used for the optical mixing, showing a front view of the cavity.
Figure 6:
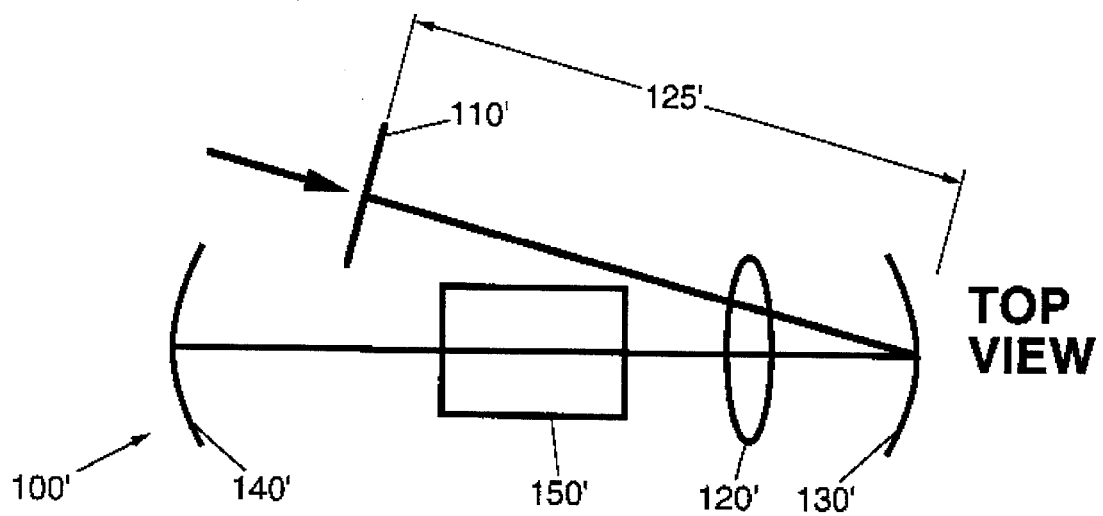
FIG. 6 is a top view of the generator of FIG. 5.

FIGS. 5 and 6 show a resonant frequency mixer in which the output from a single frequency 1047 nm InGaAs diode laser is resonantly enhanced in an external cavity containing $MgO:LiNbO_3$ and mixed with a second input from a 1320 nm diode laser. The 1320 nm input is not resonantly enhanced but the 584 nm output is. The cavity is designed to be degenerate at the output wavelength.

The optical cavity design is identical to that of FIGS. 3 and 4. Accordingly, the same reference numerals, but including a prime (') will be used. The input mirror 110' is coated for high reflectivity at 584 nm, R>90% at 1047 nm and high transmission (T<10%) at 1320 nm. The 1047 nm reflectivity is optimally equal to the sum of the passive and nonlinear roundtrip losses of the resonator at 1047 nm (impedance matching). The two curved mirrors 130', 140' are highly reflecting at 1047 nm, 584 nm and 1320 nm with radii chosen as described in the description of FIGS. 3 and 4. The nonlinear crystal 150' is a 5mm-long magnesium oxide doped lithium niobate oriented for critical phase matching of the sum frequency process at a temperature below 100C. The exact angle at which the crystal is cut will depend on the desired operating temperature of the frequency convertor. The surfaces of the niobate are AR coated for 584 nm and 1047 nm and are highly transmitting at 1320 nm. The output mirror 120' is highly reflecting at 1047 nm and has a reflectivity greater than 80% at 584 nm.

In operation, the 1047 nm input must be spatially and spectrally mode-matched to a fundamental mode of the resonant cavity. The frequency of the 1320 nm diode must also be controlled in order to match the frequency of the 584 nm output to a resonance of the optical cavity. Conventional electronic locking must be used to adjust the output frequency. The 1047 nm input can be locked to the cavity using either electronic or passive optical techniques.

The 1320 nm, input could be resonantly enhanced instead of the 1047 nm input without changing anything other than the mirror reflectivities and the locking.

In the previously-described embodiments, resonators according to the invention have been advantageously used for SHG and mixing, wherein the resonators were degenerate for the output radiation. At the same time, these embodiments also required that an input beam be mode-matched into the cavity. According to an alternative embodiment of the invention, however, the cavity may be made degenerate for an input beam. This could be achieved in any of the resonators of FIGS. 1–6 if the focal length of the lens at the fundamental wavelength were used to make the necessary distance calculations. Making the cavity degenerate for the input wavelength is advantageous in that it allows a source beam to be introduced into the cavity without the expense or additional parts required to mode match the input beam to the cavity. This represents an advantage over, for example, the fundamental singly-resonant case of Ashkin. There, power conversion efficiencies were realized by resonating the fundamental, but mode-matching of the fundamental was required—thus costing expensive optics and assembly complexity.

As discussed in the previous description of degenerate cavities, any arbitrary beam, in a cavity that is degenerate for a beam of that frequency, is effectively a mode of that cavity.

This is due to the fact that all of the terms in the eigenmode expansion of that field are resonant at the same frequency. Thus, despite the fact that the spatial quality of the input beam may be poor (i.e. not matched to the TEM$_{00}$ mode of the cavity at the fundamental), the input beam still resonates in the cavity, because the cavity is degenerate for that input frequency.

An input degenerate cavity is of particular advantage when a semiconductor diode laser is used as an input for the nonlinear frequency conversion process or when there is significant beam walkoff for one of the input beams. Because the output of a laser diode is both astigmatic and elliptical, a complicated optical system (typically a collimating lens, anamorphic pair, cylindrical lens and mode matching lens) must be used to match the mode of single stripe diode laser to the TEM$_{00}$ mode of a conventional resonator. These optics are expensive and significantly increase the optomechanical complexity of a diode-laser-based resonant nonlinear device.

Figure 7:
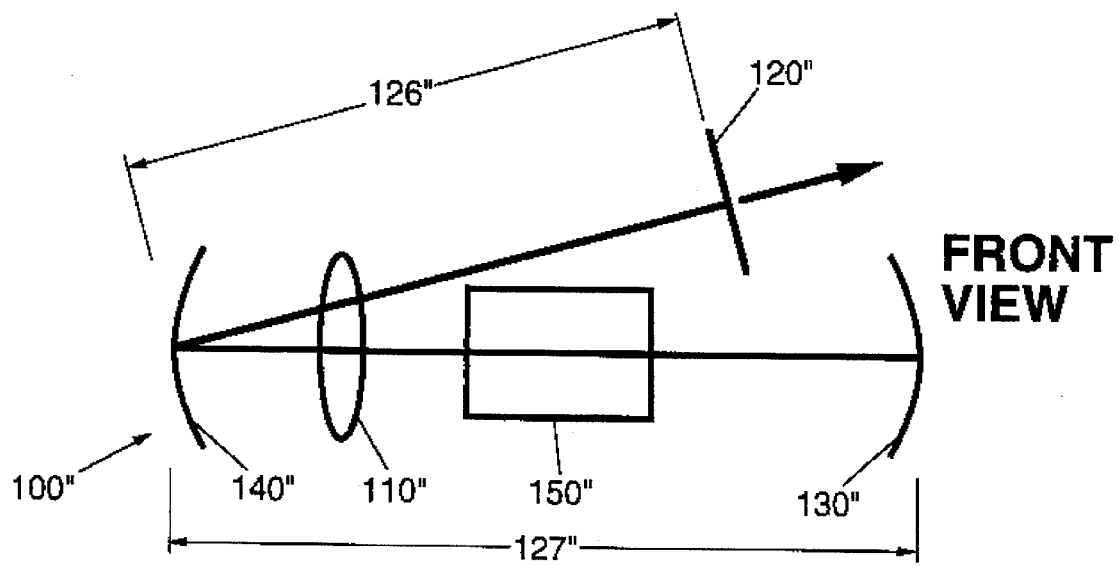
FIG. 7 is a schematic representation of a degenerate optical cavity according to a further embodiment of the invention, which is degenerate for an input wherein a four-mirror cavity with astigmatism correction is used as the cavity, showing a front view of the cavity.
Figure 8:
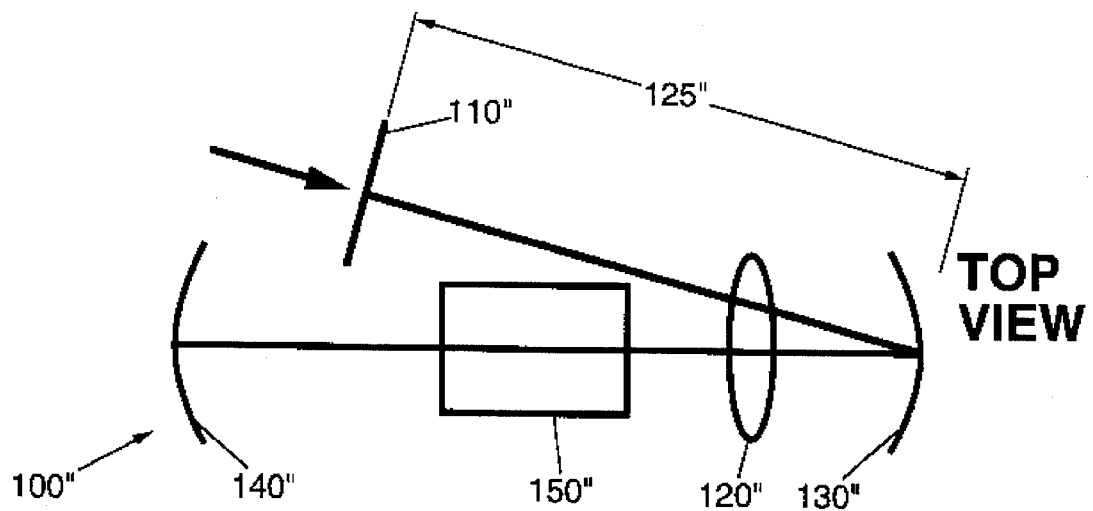
FIG. 8 is a top view of the generator of FIG. 7.

An example of a simplified diode-laser-based resonant non-linear device, wherein the cavity is degenerate for an input beam, is shown in FIGS. 7 and 8. Since the optical cavity design and relevant wavelengths are the same as in FIGS. 5 and 6, the same reference numerals, but including a double-prime (") will be used.

Once again, we consider sum frequency generation between a 1047 nm diode laser and a 1320 nm diode laser to generate an output at 583 nm. In this case, the only field that is resonantly enhanced is the 1047 nm diode laser input. The cavity is designed to be degenerate at this wavelength. Phase matching considerations are identical to those described in the example of FIGS. 5 and 6. The input mirror is coated at 1047 nm to impedance match the sum of the nonlinear and linear intracavity losses. Typical reflectivity values are greater than 90%. This mirror is also highly transmitting at 1320 nm. The output flat 120" is highly reflective at both 1047 nm and highly transmitting at 584 nm. In practice, the frequency of the 1047 nm laser must be matched to a cavity resonance using active or passive locking techniques. Spatial mode matching of this input, however, is unnecessary since the cavity is designed to be degenerate at this wavelength.

In the specific case of SHG in an external cavity, making the cavity degenerate for the input as opposed to the harmonic wavelength may not be particularly advantageous. This is due to the fact that the actual mechanism for generation of the second harmonic upon propagation of the input beam through the BBO crystal is most efficient if the input beam is mode-matched to the TEM$_{00}$ mode of the fundamental. Even so, the use of an external cavity that is degenerate for the input wavelength is advantageous for the general case of an external resonator for the reasons described above. Accordingly, if the spatial quality of the input beam is not critical for the mechanism for which the cavity is being used, the cavity can be made degenerate for that input wavelength. This would allow the significant savings in expense and parts count since none of the input optics necessary for mode matching would be required.

Figure 9:
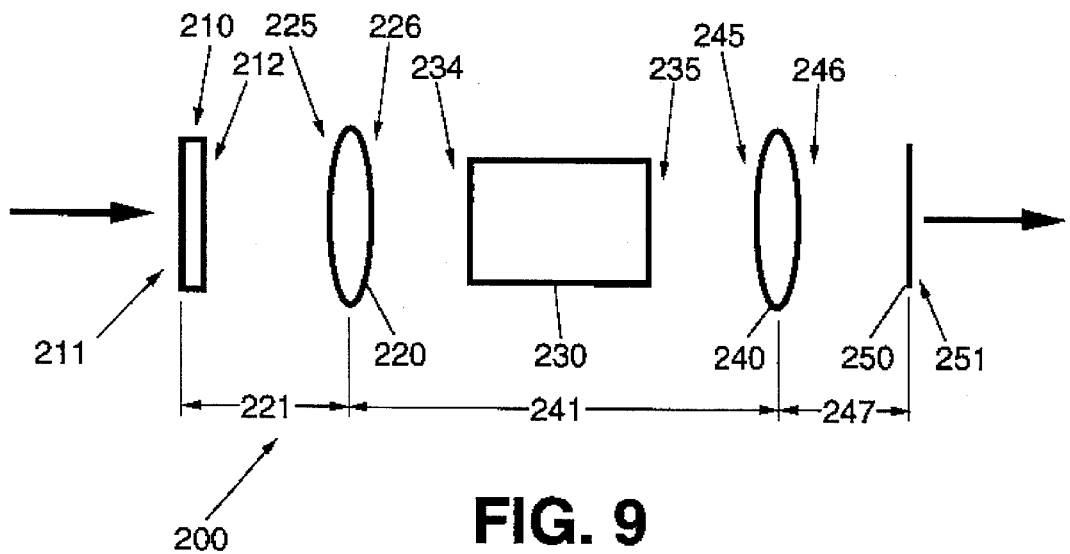
FIG. 9 is the schematic representation of an intracavity optical mixer, that is degenerate for the external input light.

While the previous embodiments were directed to either SHG or frequency mixing in external cavities, the principles of degeneracy may also be advantageously applied in the intracavity setting. FIG. 9 shows an example of intracavity frequency mixing wherein the cavity is degenerate for the input beam.

FIG. 9 is a schematic representation of a resonantly pumped, 3.4 μm difference frequency laser in which resonantly-enhanced input from an 806 nm single-stripe diode is mixed with the intracavity field of a 1064 nm Nd:YAG laser to generate an output at 3.4 μm. In addition to providing one of the inputs for the nonlinear mixing process, the resonantly enhanced 809 nm field pumps the Nd:YAG crystal. Silver thiogallate is used as the nonlinear crystal and angle-tuned, critical phase matching is required to generate the desired output wavelength. In this device the 809 nm intracavity field also pumps the Nd:YAG crystal.

In FIG. 9, a single-frequency, 809 nm diode laser input is imaged onto the input mirror of a resonator 200 that is designed to be degenerate for that wavelength. Conventional means are used to isolate the diode laser from radiation that is reflected directly from the input mirror and imaging optics consisting of at least one spherical lens are used to collect the diode laser output and focus it into the cavity. A 300 μm thick Nd:YAG crystal 210 with a Nd impurity concentration of 0.04% acts as the input mirror to the device. The flat outer surface of this crystal 211 is coated for high reflectivity at 1064 nm and has a reflectivity at 809 nm that is equal to the intracavity losses (absorption plus nonlinear conversation). The 809 nm reflectivity is typically be in the range between 90% and 99%. The intracavity surface of the Nd:YAG crystal 212 is antireflection coated at both 809 nm and 1064 nm. A lens, 220, with a focal length, f, is positioned so that the diffractive path length 221 between the lens 220 and the input facet 211 of the Nd:YAG crystal is equal to the focal length of the lens. This lens 220 is AR-coated for 809 nm and 1064 nm on both surfaces 225 and 226. A crystal 230 of silver thiogallate with crystal axes oriented to phase match the 809 nm–1064 nm difference frequency process is located halfway between lens 220 and an infrared transmitting lens 240 having the same focal length, f. The diffractive path length 241 between the two lenses 220, 240 is equal to 2f. Lens 240 is AR coated at 1064 nm and 809 nm and has high transmission at 3.4μm. The output facet 235 of the crystal 230 is antireflection coated at 1064 and 809 nm, and is coated for high transmission at 3.4 μm. The input facet 234 is antireflection coated at 1064 and 809 nm. The output mirror 250 is flat and coated at 251 for high reflectivity at 1064 nm and 809 nm and high transmission at 3.4 μm. It is located at a distance 247 from the second lens 240 that is equal to the focal length f of the lens. In order for the 3.4 μm difference frequency output to exit the cavity, both lens 240 and the output mirror 250 must be fabricated from an IR-transmitting material like CaF$_2$ or sapphire. All lengths described above are for the 809 nm input wavelength making the device degenerate for the diode laser input.

Figure 10:
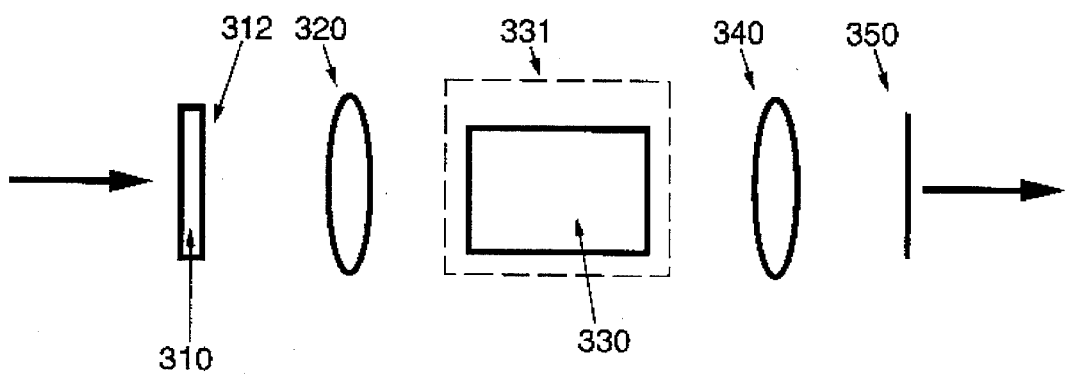
FIG. 10 is a schematic representation of an intra-cavity second harmonic generator that is degenerate for the output wavelength.

An example of advantageous use of the principles of degeneracy in the intracavity SHG setting is seen in FIG. 10. Intracavity doubling of a 1317 nm LNP laser can be used to generate an output wavelength in the red at 658 nm. Non-critical phase matching of the second harmonic process is possible in MgO:LiNbO$_3$ at elevated temperatures (greater that 300C). Critical phase matching can be used to reduce this temperature to a value below 100C. Resonance of the harmonic in a degenerate optical cavity can be used to increase the efficiency of 658 nm red light generation in the critically phase matched system shown in FIG. 10. The resonator design is similar to that of FIG. 9 with the focal lengths of the two lenses 320,340 and their separation from each other and the cavity end mirrors (350 and intracavity face 312 of crystal 310) chosen to make the cavity degenerate at 658 nm. In this device, an intense intracavity field at 1317 nm is generated by pumping a thin crystal 310' of lithium neodymium tetraphosphate, LNP, with a 200mW phased diode array. The external face of the LNP crystal is coated for high reflectivity (99.7%R) at 1327 nm and 658 nm and high transmission at the 803 nm and 1317 nm as are the MgO:LiNbO$_3$ crystals and the two lenses. Further, the MgO:LiNbO$_3$ is housed in an oven 331. The output mirror is coated for high reflectivity at 1317 nm and a small transmission (<20%) at the harmonic wavelength. In operation, the 803 nm pump diode is focused into the LNP gain crystal to produce laser oscillation at 1317 nm. The angle and/or temperature of the MgO:LiNbO$_3$ are tuned to achieve the correct phase conditions for harmonic resonant enhancement and the temperature of the LNP is adjusted to make the cavity resonant at both the fundamental and harmonic wavelengths. Single frequency operation of the LNP laser is achieved by adjusting the pump polarization and wavelength to effectively eliminate spatial hole burning. There has thus been shown a variety of frequency conversion cavities and techniques employing the principles of degeneracy—either to enhance power conversion efficiencies, or to realize efficiencies by allowing reduction in optics for mode-matching inputs into the cavity. While the invention has been described with reference to several embodiments, those exemplary embodiments are not intended to be limiting. Rather, the invention includes all modifications or equivalents of these and other embodiments as may fall within the spirit and scope of the appended claims.

What is claimed is:

1. A resonator for generating second harmonic radiation from an input laser light source, comprising, in combination:

a quantity of non-linear optical material which converts the input light to the second harmonic; and an optical cavity enclosing the non-linear optical material, the cavity including optical elements disposed such that the cavity is degenerate for the transverse modes of the second harmonic and resonant for at least the second harmonic.

2. The resonator of claim 1, wherein the optical elements are disposed such that the cavity is resonant for the fundamental and the harmonic.

3. The resonator of claim 1, wherein the optical elements include a first, planar mirror, a second, spherical mirror of radius R, and a lens of focal length f disposed between the non-linear optical material and the spherical mirror at a distance of R+f from the spherical mirror, and at a distance of f$^2$/R+f from the planar mirror.

4. The resonator of claim 1, wherein the optical cavity is non-planar, and the optical elements include planar input and output mirrors and two intermediate spherical mirrors of the same radius, the planar input mirror and the two spherical mirrors being disposed in one plane, and the planar output mirror and the two spherical mirrors being disposed in a second plane, the non-linear optical material being disposed on the axis of and between the spherical mirrors.

5. The resonator of claim 1, wherein one of the optical elements is a gain medium, and the optical cavity is the laser cavity of the gain medium, the gain medium providing the input laser light.

6. A resonator for generating second harmonic radiation from an input laser light source, comprising, in combination:

a quantity of non-linear optical material which converts the input light to the second harmonic; and an optical cavity enclosing the non-linear optical material, the cavity including optical elements disposed such that the cavity is half degenerate for the transverse modes of the second harmonic and resonant for at least the second harmonic.

7. A resonator for generating second harmonic radiation from an input fundamental laser light source, comprising:

a quantity of non-linear optical material which converts the input light to the second harmonic; and an optical cavity enclosing the non-linear optical material, the cavity including optical elements disposed such that the cavity is degenerate for the transverse modes of the fundamental and resonant for at least the fundamental.

8. The resonator of claim 7, wherein the optical elements are disposed such that the cavity is resonant for the harmonic and the fundamental.

9. A resonator for generating second harmonic radiation from an input fundamental laser light source, comprising:

a quantity of non-linear optical material which converts the input light to the second harmonic; and an optical cavity enclosing the non-linear optical material, the cavity including optical elements disposed such that the cavity is half degenerate for the transverse modes of the fundamental and resonant for at least the fundamental.

10. A resonator for generating optically mixed radiation from a first and second input laser light source, comprising:

a quantity of non-linear optical material which mixes the first and second input laser light to form the mixed radiation;

an optical cavity enclosing the non-linear optical material, the cavity including optical elements disposed such that the cavity is degenerate for the transverse modes of the mixed radiation and resonant for at least the mixed radiation.

11. A resonator according to claim 10, wherein the optical elements are disposed such that the cavity is resonant for at least one of the first and second input laser light sources.

12. A resonator according to claim 10, wherein one of the optical elements is a gain medium, and the optical cavity is the laser cavity for the gain medium, the gain medium comprising one of said first and said second input laser light source.

13. A resonator for generating optically mixed radiation from a first and second input laser light source, comprising:

a quantity of non-linear optical material which mixes the first and second input laser light to form the mixed radiation;

an optical cavity enclosing the non-linear optical material, the cavity including optical elements disposed such that the cavity is half degenerate for the transverse modes of the mixed radiation and resonant for at least the mixed radiation.

14. A resonator for generating optically mixed radiation from a first and second input laser light source comprising;

a quantity of non-linear optical material which mixes the first and second input laser light to form the mixed radiation;

an optical cavity enclosing the non-linear optical material, the cavity including optical elements disposed such that the cavity is degenerate for the transverse modes of the first input laser light and resonant for at least the first input laser light.

15. A resonator according to claim 14, wherein the optical elements are disposed such that the cavity is resonant for at least one of the second input laser light and the mixed radiation.

16. A resonator according to claim 14, wherein one of the optical elements is a gain medium, and the optical cavity is the laser cavity of the gain medium, the gain medium comprising one of said first and said second input laser light source.

17. A resonator for generating optically mixed radiation from a first and second input laser light source comprising;

a quantity of non-linear optical material which mixes the first and second input laser light to form the mixed radiation; and an optical cavity enclosing the non-linear optical material, the cavity including optical elements disposed such that the cavity is half-degenerate for the transverse modes of the first input laser light and resonant for at least the first input laser light.

18. A method for generating a second harmonic signal from an input laser signal, comprising the steps of:

admitting input laser light into an optical cavity tuned to be degenerate for transverse modes of a second harmonic light of the input laser light;

passing the input laser light in the optical cavity through a non-linear optical material critically phase-matched to generate the second harmonic light;

circulating the generated second harmonic light through the cavity to produce a circulating harmonic field;

fully coupling the transverse modes of the generated second harmonic to the circulating second harmonic field; and removing a portion of the circulating second harmonic field from the cavity as an output.

19. The method of claim 18, wherein the step of circulating the generated second harmonic light comprises tuning the cavity to be resonant for the second harmonic.

20. The method of claim 18, and including the step of tuning the cavity to be resonant for the input laser light.

21. A method for generating optically mixed radiation from sources of first and second input laser lights, comprising the steps of:

admitting the first and second input laser lights into an optical cavity tuned to be degenerate for transverse modes of a mixed radiation;

passing the first and second input laser light through a non-linear optical material critically phase-matched to generate the mixed radiation;

circulating the mixed radiation through the cavity to produce a circulating mixed field;

fully coupling the transverse modes of the mixed radiation to the circulating mixed field; and removing a portion of the circulating mixed field from the cavity as an output.

* * * * *